United States Patent
Hurley (10) Patent No.: US 7,870,179 B2
(45) Date of Patent: Jan. 11, 2011

(54) APPARATUS AND METHOD FOR OPTIMAL IMPLEMENTATION OF THE CORDIC ALGORITHM FOR WIRELESS RFIC DIGITAL DOWN-CONVERSION

(75) Inventor: William Milton Hurley, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1147 days.

(21) Appl. No.: 11/524,561

(22) Filed: Sep. 21, 2006

(65) Prior Publication Data
US 2008/0126463 A1  May 29, 2008

(51) Int. Cl.
*G06F 7/38* (2006.01)
(52) U.S. Cl. .................................................. 708/441

(58) Field of Classification Search .......... 708/440–442
See application file for complete search history.

(56) References Cited

U.S. PATENT DOCUMENTS
2006/0093070 A1* 5/2006 Ibrahim et al. ............... 375/324

* cited by examiner

*Primary Examiner*—Tan V Mai (57) ABSTRACT

A Coordinate Rotation Digital Computer (CORDIC) circuit capable of performing precise vector rotation, including a pre-rotation stage configured to selectively rotate an input vector by ±90 degrees and to produce a pre-rotated vector. A first stage is configured to perform a first set of iterative CORDIC calculations on the pre-rotated vector and to produce a first rotated vector and a remaining rotation value. A second stage configured to perform a second set of iterative CORDIC calculations on the first rotated vector and to produce a second rotated vector, the second rotated vector corresponding to the input vector.

21 Claims, 5 Drawing Sheets

APPARATUS AND METHOD FOR OPTIMAL IMPLEMENTATION OF THE CORDIC ALGORITHM FOR WIRELESS RFIC DIGITAL DOWN-CONVERSION

TECHNICAL FIELD OF THE INVENTION

The present application relates, in general, to digital communication systems and, more specifically, to an improved digital down-conversion system and method.

BACKGROUND OF THE INVENTION

As digital processing technologies expand, it is important for digital down-conversion systems to be well designed. COrdinate Rotation Digital Computer (CORDIC) algorithms avoid direct sine/cosine synthesis and multipliers that are commonly found in digital down-conversion systems.

The CORDIC algorithm is an iterative method to calculate transcendental functions and/or rotate vectors. For the purposes of digital down-conversion, CORDIC algorithms typically rotate an in-phase/quadrature (I/Q) vector at an infrared (IF) frequency and effectively down-convert to a baseband I/Q vector. After an initial ±90 degree rotation, Equations 1-3 are repeatedly used to rotate a vector by a desired amount.

$$X_i + 1 = X_i - d_i\left(\frac{Y_i}{2^i}\right) \quad \text{[Eqn. 1]}$$

$$Y_i + 1 = Y_i - d_i\left(\frac{X_i}{2^i}\right) \quad \text{[Eqn. 2]}$$

$$Z_i + 1 = Z_i - d_i\left(\arctan\frac{1}{2^i}\right) \quad \text{[Eqn. 3]}$$

For Equations 1-3, X is the in-phase portion of the vector (I), Y is the quadrature portion of the vector (Q), and Z is the desired rotation angle. The value "i" is based on the number of required iterations. For Equations 1-3, $d_i = -1$ for $Z_i < 0$, else $d_i = +1$. As the number of iterations increases, the error in the rotation approximation decreases.

Typically, wireless applications require between twelve (12) and sixteen (16) iteration counts to meet performance requirements. In other words, for each I/Q sample, the downconverter uses Equations 1-3 approximately 12 to 16 times. Although this mechanism is more efficient than look up tables and multipliers, the large number of iterations consumes excessive silicon and/or requires significantly faster clock rates.

CORDIC processor implementations essentially focus on using a single piece of hardware iteratively to calculate all 16 iterations or on unrolling the loop and implementing each iteration as a piece of hardware. In single hardware blocks, the minimum clock rate required is the number of iterations multiplied by the data path sample rate.

For wireless applications where performance requirements demand finer precision and a greater number of iterations, the required clock rate is detrimental to power consumption and larger power consuming buffers are often required. For example, if the sample rate of the receiver is 25 MHz, then the required clock rate to down-convert with 16 iterations would be 400 MHz. Even with some of the extreme process nodes, 400 MHz can be a challenging requirement and ultimately unachievable. Moreover, an unrolled version of a CORDIC processor utilizes a hardware stage for each iteration of the algorithm. The area required for down-conversion increases the allotted die area and increases cost.

Therefore, what is needed is an improved CORDIC processor for use in wireless applications.

SUMMARY OF THE INVENTION

According to various disclosed embodiments, a CORDIC circuit capable of performing precise vector rotation is provided. The CORDIC circuit includes a pre-rotation stage configured to selectively rotate an input vector by ±90 degrees and to produce a pre-rotated vector. The CORDIC circuit also includes a first stage configured to perform a first set of iterative CORDIC calculations on the pre-rotated vector and to produce a first rotated vector and a remaining rotation value, and a second stage configured to perform a second set of iterative CORDIC calculations on the first rotated vector and to produce a second rotated vector, the second rotated vector corresponding to the input vector.

In another embodiment, a mobile station for use in a wireless network is provided. The mobile station includes a processor, a radio-frequency transceiver for receiving a radio-frequency signal, and an RF downconversion circuit for downconverting the radio-frequency signal to produce an input vector. The mobile station also includes a CORDIC circuit connected to receive the input vector, the CORDIC circuit having a pre-rotation stage configured to selectively rotate an input vector by ±90 degrees and to produce a pre-rotated vector, a first stage configured to perform a first set of iterative CORDIC calculations on the pre-rotated vector and to produce a first rotated vector and a remaining rotation value, and a second stage configure to perform a second set of iterative CORDIC calculations on the first rotated vector and to produce a second rotated vector, the second rotated vector corresponding to the input vector.

In still another embodiment, a method for vector rotation for use in a wireless network is provided. The method includes selectively rotating an input vector by ±90 degrees to produce a pre-rotated vector, performing a first set of iterative CORDIC calculations on the pre-rotated vector in a first circuit stage to produce a first rotated vector and a remaining rotation value, and performing a second set of iterative CORDIC calculations on the first rotated vector in a second circuit stage to produce a second rotated vector. The second rotated vector corresponds to the input vector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure and are by way of illustration only and should not be construed in any way to limit the scope of the disclosure. Those skilled in the art will understand that the principles of the present disclosure may be implemented in any suitably arranged device requiring CORDIC algorithms.

Figure 1:
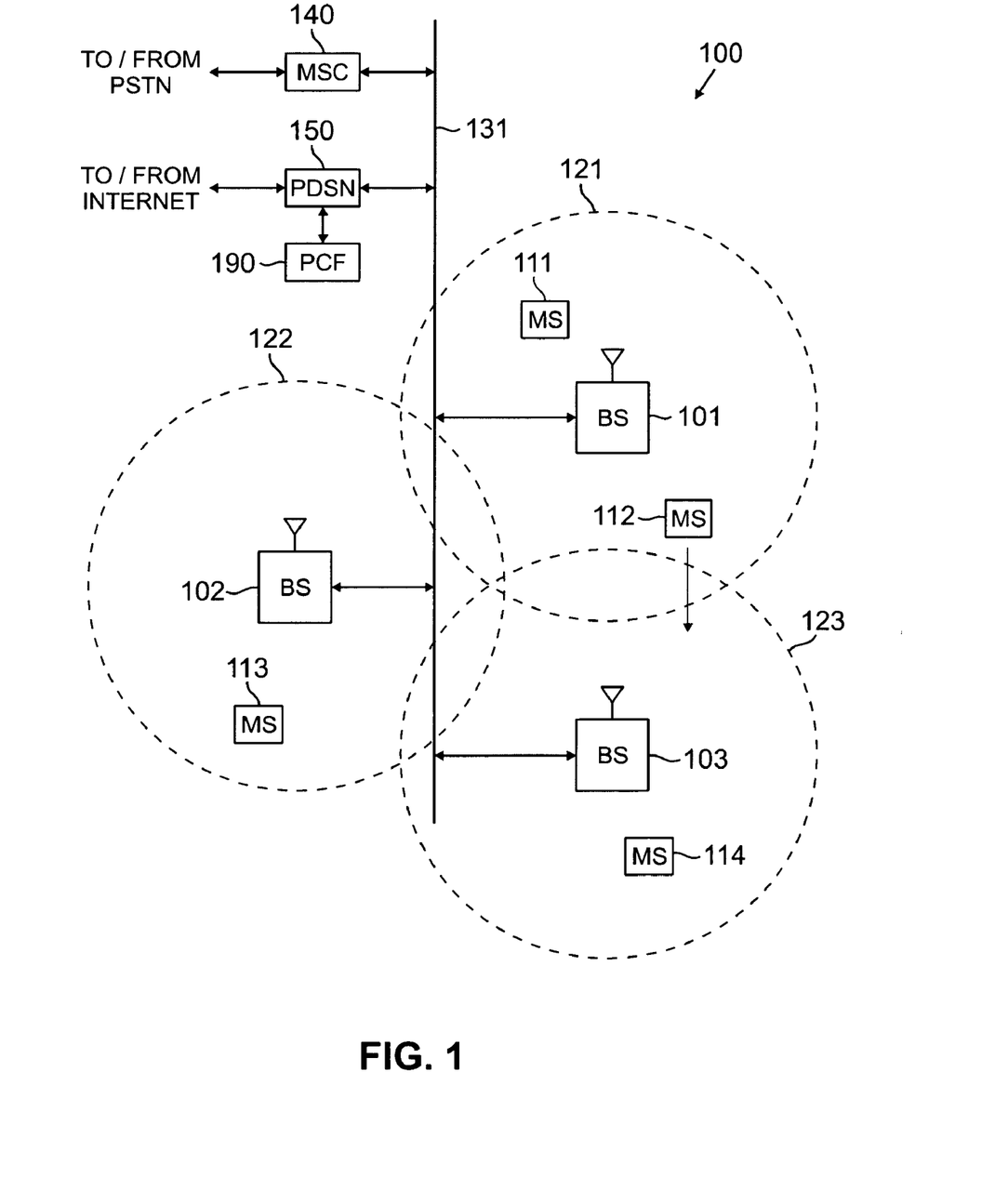
FIG. 1 illustrates a wireless network according to an exemplary embodiment of the disclosure.

FIG. 1 illustrates exemplary wireless network 100, in which CORDIC algorithm according to the principles of the present disclosure may be implemented. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2:
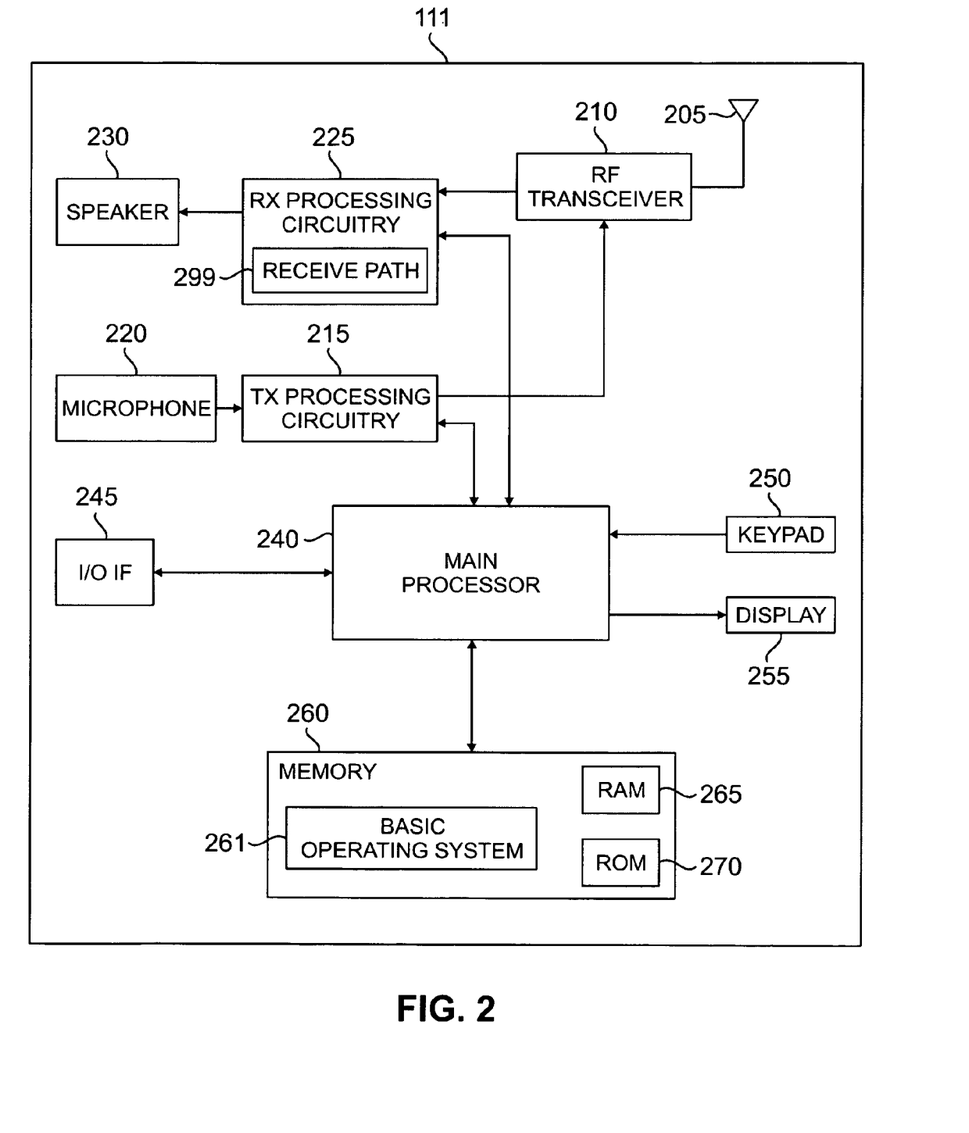
FIG. 2 illustrates a mobile station according to an exemplary embodiment of the disclosure.

FIG. 2 illustrates MS 111 according to one embodiment of the present disclosure. MS 111 includes antenna 205, radio frequency (RF) transceiver 210, transmit (TX) processing circuitry 215, microphone 220 and receive (RX) processing circuitry 225. MS 111 also comprises speaker 230, main processor 240, input/output (I/O) interface (IF) 245, keypad 250, display 255, and memory 260. Memory 260 further comprises basic operating system (OS) program 261.

RF transceiver 210 receives from antenna 205 an incoming RF signal transmitted by a base station of wireless network 100. RF transceiver 210 down-converts the incoming RF signal to produce an intermediate frequency or a baseband signal. The intermediate frequency or baseband signal is sent to RX processing circuitry 225, which produces a processed baseband signal by filtering, digitizing the intermediate frequency or a baseband signal, performing additional filtering and, if necessary, demodulating and/or decoding, using receive path circuitry 299. RX processing circuitry 225 transmits the processed baseband signal to speaker 230 (e.g., when the signal includes voice data). Alternatively, the processed baseband signal may be transmitted to main processor 240 for further processing (e.g., web browsing).

TX processing circuitry 215 receives analog or digital voice data from microphone 220 or other outgoing baseband data (e.g., web data, e-mail, interactive video game data) from main processor 240. TX processing circuitry 215 encodes, modulates, multiplexes, and/or digitizes the outgoing baseband data to produce a processed baseband or intermediate frequency (IF) signal. RF transceiver 210 receives the outgoing processed baseband signal from TX processing circuitry 215. RF transceiver 210 up-converts the signal to a radio frequency (RF) signal transmitted via antenna 205.

In one embodiment of the present disclosure, main processor 240 is a microprocessor or microcontroller. Memory 260 is coupled to main processor 240. Part of memory 260 may include a random access memory (RAM) 265 and a non-volatile memory 270, such as flash memory, which acts as a read-only memory (ROM).

Main processor 240 executes basic OS program 261 stored in memory 260 in order to control the overall operation of MS 111. In one such operation, main processor 240 controls the reception of forward channel signals and the transmission of reverse channel signals by RF transceiver 210, RX processing circuitry 225 and TX processing circuitry 215 in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides MS 111 with the ability to connect to other devices such as laptop computers and handheld computers. In other words, I/O interface 245 serves as a communication path between these accessories and main controller 240.

Main processor 240 is also coupled to keypad 250 and display 255. The operator of MS 111 uses keypad 250 to enter data into MS 111. Display 255 may be a liquid crystal display capable of rendering text and/or at least limited graphics from web sites. Alternate embodiments may use other types of displays.

Figure 3:
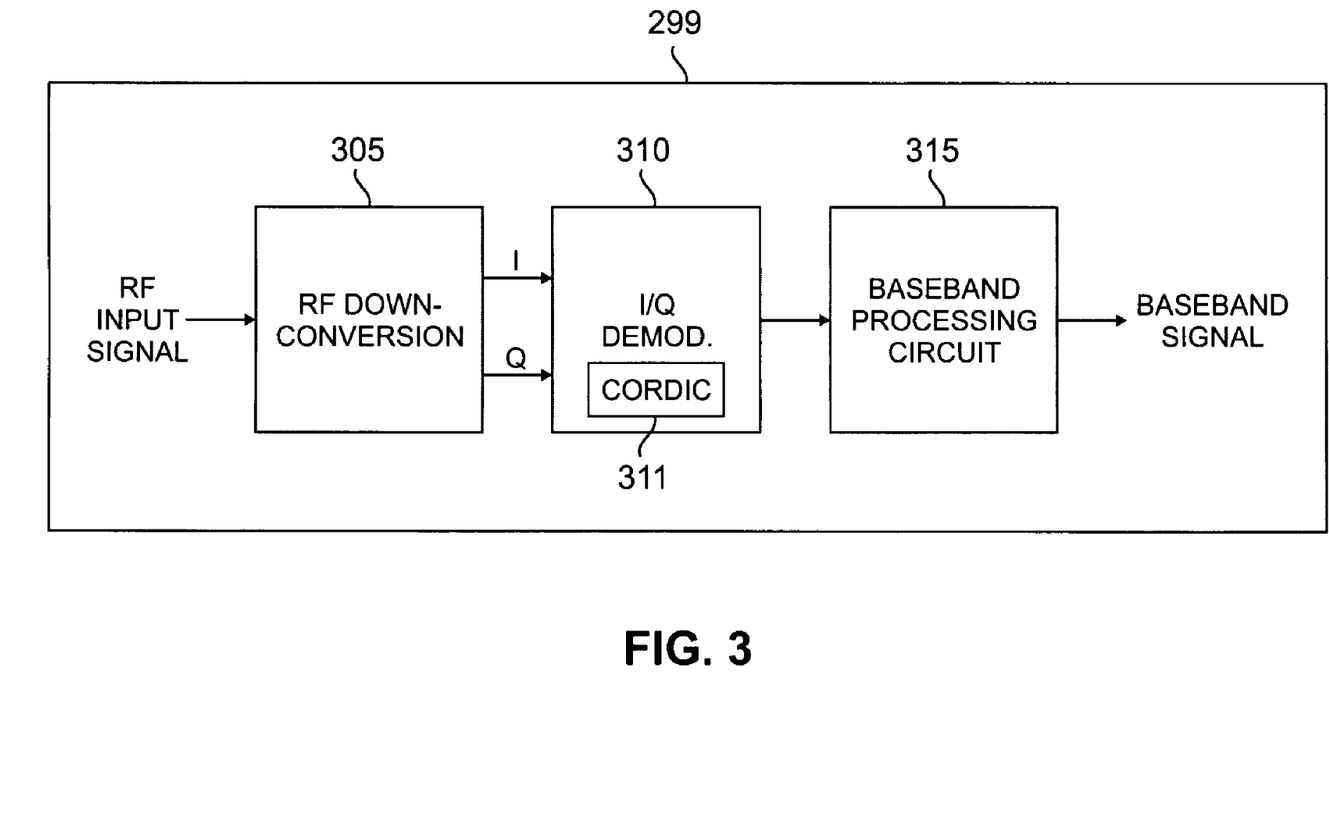
FIG. 3 illustrates selected portions of the receive path circuitry in a mobile station or base station according to an exemplary embodiment of the disclosure.

FIG. 3 illustrates selected portions of the receive path circuitry 299 in MS 111 or BS 101 according to one embodiment of the present disclosure. In MS 111, receive path circuitry 299 may be part of RX processing circuitry 225 as shown in FIG. 2. In other embodiments, receive path circuitry 299 may be located separately from RX processing circuitry 225. Receive path circuitry 299 includes RF down-conversion block 305. Receive path circuitry 299 also includes I/Q demodulation block 310. I/Q demodulation block 310 includes CORDIC circuit 311. Receive path circuitry 299 further includes baseband processing circuit 315.

RF down-conversion block 305 mixes the RF input signal with a $\sin(\omega t)$ reference carrier and a $\cos(\omega t)$ carrier reference to produce a raw in-phase (I) signal and a raw quadrature (Q) signal that may be rotated by an angle ($\phi$) as later described in conjunction with FIG. 5.

The I/Q demodulation block generates a baseband signal suitable for further processing by the Baseband processing circuit. In the case of a non-zero IF, the I/Q demodulation block must down convert the complex IF signal to baseband.

One method for such down-conversion is a Weaver architecture complex down conversion. The Weaver architecture requires 4 multipliers, two adders, and sin and cos synthesis, which typically requires significant silicon area. However, the use of a CORDIC and a phase accumulator can achieve the same mathematical result as the Weaver down converter. By rotating an incoming I and Q signal by an ever increasing/decreasing phase angle, the effect is a down or up conversion with an oscillator of frequency corresponding to the phase angle increase/decrease. The increasing/decreasing phase angle may be generated by a phase accumulator in which the appropriate angle is added every sample period. With the use of a phase accumulator and CORDIC, the mathematical equivalent of a Weaver complex architecture is implemented with a few adders and shifters instead of the multipliers and sine wave synthesis. Therefore, it is advantageous to use a CORDIC in a down conversion application.

Further, it is advantageous to optimize the area for low cost. One method is to run a process as the highest possible clock rate, time sharing resources to the greatest extent. However, the low power constraints of wireless terminals limit the maximum achievable clock rate. Therefore, a method to optimize the CORDIC circuit as disclosed herein is particularly advantageous.

I/Q demodulation block 310 may also despread the I* and Q* signals to produce a composite baseband signal. Baseband processing circuit 315 further processes the composite baseband signal to recover, for example, a traffic channel or a control channel (e.g., pilot, paging, synchronization, access).

Figure 4A:
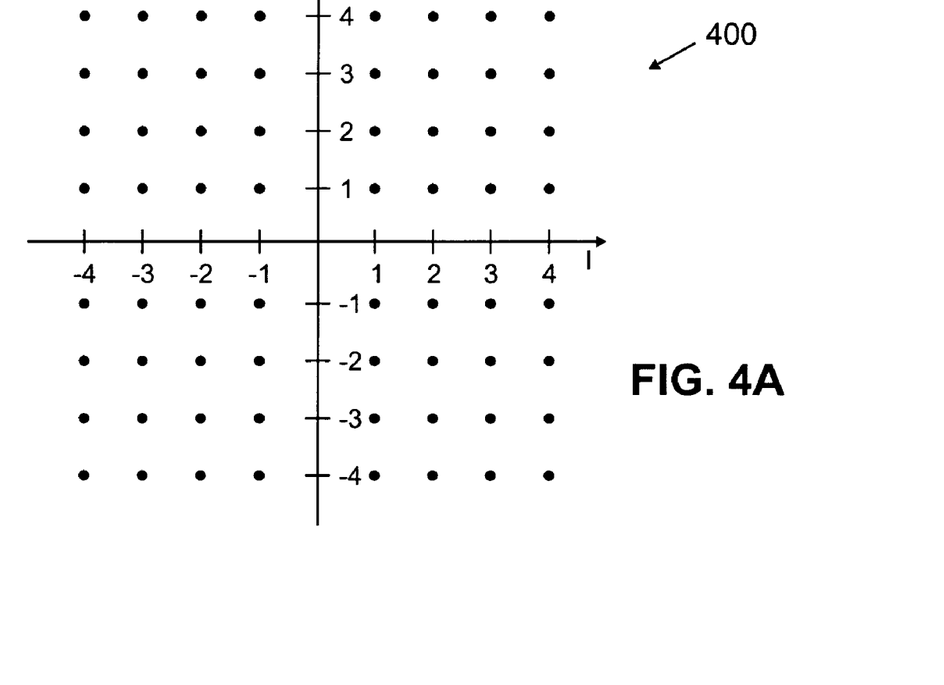
FIGS. 4A and 4B illustrate an exemplary constellation of I and Q values before and after rotation according to an exemplary embodiment of the disclosure.

An exemplary (I, Q) constellation 400 including raw I and Q values is shown in FIG. 4A. Exemplary (I, Q) constellation 400 contains sixty four (64) possible values of (I, Q), where:
I=−4, −3, −2, −1, +1, +2, +3, +4; and
Q=−4, −3, −2, −1, +1, +2, +3, +4.

Figure 4B:
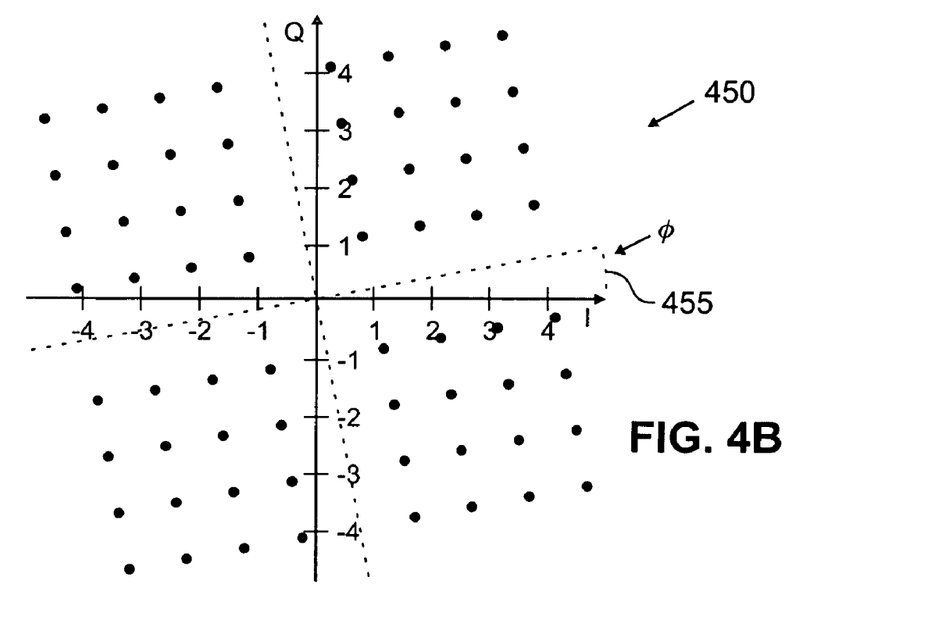

FIG. 4B shows an exemplary (I, Q) constellation 450 after the sixty four possible values of (I, Q) in constellation 400 described above have been rotated by phase angle ($\phi$) 455.

In addition to its use in rotating a constellation by a static value, a particularly advantageous application of the disclosed CORDIC techniques is based on rotation of the I/Q by an increasing/decreasing phase angle for down conversion, as described herein.

Disclosed embodiments include a hybrid implementation of an iterative CORDIC algorithm performed by CORDIC circuit 311 I/Q demodulation block 310, partitioned in such a way as to allow a balance between silicon area and frequency. This allows the designer the flexibility to tailor the implementation to the process node and power consumption requirements. In one embodiment, iterations are broken into multiple pipelined stages where each stage calculates a portion of the overall rotation.

Figure 5:
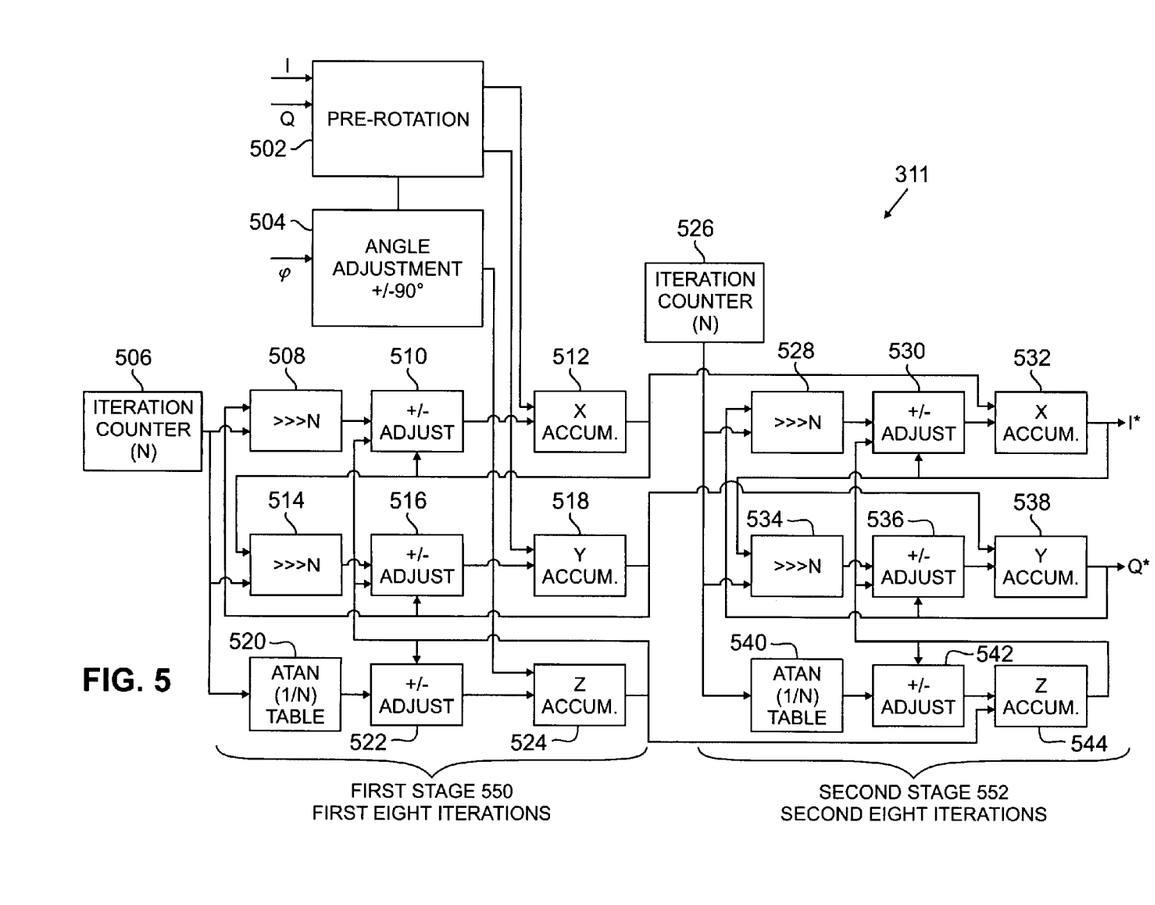
FIG. 5 illustrates one embodiment of a CORDIC circuit utilizing two iteration stages according to an exemplary embodiment of the disclosure.

FIG. 5 illustrates one embodiment of CORDIC circuit 311 utilizing two iteration stages, first iteration stage 550 and second iteration stage 552. CORDIC circuit 311 may be part of I/Q demodulation block 310 as shown in FIG. 5 or be located separately from I/Q demodulation block 310. CORDIC circuit 311 functions as a pipeline of iterative stages, where each iterative stage performs multiple iterations of CORDIC calculations. In this way, CORDIC circuit 311 provides both a pipelined CORDIC processor and an iterative CORDIC processor in accordance with an embodiment of the present disclosure.

The required I/Q vectors are received from pre-rotation block 502. The required phase rotation angle φ is received at angle adjustment block 504. When used as part of a down-conversion block, the required phase rotation angle φ is an increasing/decreasing phase angle, as known to those of skill in the art. When the disclosed CORDIC techniques are used for constellation rotation, the required phase rotation angle φ can be angle φ 455 as shown in FIGS. 4A and 4B.

The pre-rotation block 502 rotates I/Q vectors by 90 degrees in the required direction. In addition, angle adjustment block 504 adjusts the required phase rotation angle (φ) 455 to reflect the 90 degree adjustment. Thus, the remaining phase rotation angle will necessarily be less than 90 degrees. Pre-rotation block 502 and angle adjustment block 504 pass on the resulting rotation angle and the I/Q vectors after any required pre-rotation is complete.

In one embodiment, the first stage 550 calculates the first eight iterations of the rotation. The resulting vector and remaining angle to be rotated is passed to second iteration stage 552. Second iteration stage 552 performs the remaining eight iterations and continues to complete the rotation while the first stage begins on the next I/Q vector. In this example, a 25 MHz sample rate would require a clock rate of 200 MHz and only twice (2×) the silicon required in a fully iterative design. Preferably, embodiments in accordance with the present disclosure achieve a workable clock rate with a minimal increase in silicon area.

Although the embodiments describe two stages performing eight iterations each, those skilled in the art will recognize that any number of stages may be used. Although the example described above used sixteen total iterations, it should be recognized that each additional stage can then perform a smaller number of iterations while still obtaining a like precision of rotation in accordance with the present disclosure. One skilled in the art will also recognize that an embodiment can easily be partitioned such that there are four iteration stages, each performing four iterations and thus allowing for a 100 MHz clock rate at four times (4×) the silicon area required in a full iterative design. Other partitioning is equally possible and may be used in other embodiments.

To further explain the operation of CORDIC circuit 311, assume that an I/Q vector enters CORDIC circuit 311. Assume further that the incoming vector is pointed at 45 degrees and that the vector should be rotated a required phase rotation angle (φ) 455 of +75 degrees. Pre-rotation block rotates the vector by +90 degrees and angle adjustment block 504 adjusts the required phase rotation angle (φ) 455 to reflect the 90 degree adjustment. The vector then points at 135 degrees and must be rotated by the phase rotation angle (φ) of −15 degrees by first iteration stage 550 and second iteration stage 552.

In this example, first iteration stage 550 uses eight clocks to calculate the CORDIC formula for the vector. The output of the first iteration block 550 (from X accumulator 512, Y accumulator 518, and Z accumulator 524, respectively) will be the I/Q vector rotated to within about ±0.448 degrees and a phase rotation angle (φ) that represents the remaining rotation necessary. First iteration stage 550 may then begin operation on the next I/Q vector.

Second iteration stage 552 calculates the remaining eight iterations over eight clocks, rotating the vector by the remaining angle specified by the output of first iteration stage 550. The output of second iteration stage 552, I*/Q*, is the original I/Q vector rotated by the desired angle (φ) to within about 0.0017 degrees.

First iteration stage 550 and second iteration stage 552 each perform an iterative CORDIC calculation, as will be recognized by those skilled in the art. In each iteration stage 550 and 552, X accumulator 512/532 accumulates and stores the current I vector based on the output of sum/subtract block 510/530 for each iteration. The output of X accumulator 512/532, during the iterative processing, is fed to right bit-shifter 514/534. Right bit-shifter 514/534 shifts the output of X accumulator 512/532 N bits according to iteration counter 506/526. The output of right bit-shifter 514/534 is then passed to sum/subtract block 516/536, which adds or subtracts the bit-shifted value from the current value of Y accumulator 518/538. The result is passed to Y accumulator 518/538. Sum/subtract block 516/536 determines whether the bit-shifted value should be added or subtracted change based on the output of Z accumulator 524/544.

Y accumulator 518/538 accumulates and stores the current Q vector, based on the output of sum/subtract block 516/536. The output of Y accumulator 518/538, during the iterative processing, is fed to right bit-shifter 508/528. Right bit-shifter 508/528 shifts this value N bits according to iteration counter 506/526. The output of right bit-shifter 508/528 is then passed to sum/subtract block 510/530, which adds or subtracts the bit-shifted value from the current value of X accumulator 512/532. The result is passed to X accumulator 512/532. Sum/subtract block 510/530 determines whether the bit-shifted value should be added or subtracted change based on the output of Z accumulator 524/544.

Z accumulator 524/544 accumulates and stores the current rotation angle that represents the remaining rotation necessary based on the output of sum/subtract block 522/542. The output of Z accumulator 524/544, during the iterative processing, is used to control addition and subtraction of sum/subtract block 510/530 and sum/subtract block 516/536. ATAN table 520/540 computes the arctangent of (1/N) according to the value of N provided by iteration counter 506/526. The output of ATAN table 520/540 is then passed to sum/subtract block 522/542, which adds or subtracts the appropriate arctangent value from the current value of Z accumulator 524/544. The result is then passed to Z accumulator 524/544. Sum/subtract block 522/542 determines whether the bit-shifted value should be added or subtracted change based on the output of Z accumulator 524/544.

Continuing with the example, at the end of the first eight iterations, the current value of the accumulators of first iteration stage 550 (i.e., X accumulator 512, Y accumulator 518 and Z accumulator 524) is passed to the corresponding accumulators of second iteration stage 552 (i.e., X accumulator 532, Y accumulator 538 and Z accumulator 5544). At the end of the second eight iterations, the values of X accumulator 532 and Y accumulator 538 are output as the rotated I*/Q* vector for further processing in I/Q demodulation block 310.

With an architecture according to one embodiment of the present disclosure, the CORDIC algorithm provides the appropriate balance between achievable clock rate and silicon area may be implemented. Further, an optimum implementation for wireless terminals may be achieved, allowing for the most competitive wireless solutions. Moreover, the CORDIC algorithm has many applications beyond wireless receive/transmit chains. It should be understood that embodiments in accordance with the present disclosure generally apply to all CORDIC algorithms and not just CORDIC algorithms in wireless applications.

U.S. Pat. No. 7,039,130 describes an RF receiver phase correction circuit and method using CORDIC and vector-averaging functions, and is hereby incorporated by reference.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a CORDIC circuit capable of performing precise vector rotation, said CORDIC circuit comprising:
    a pre-rotation stage configured to selectively rotate an input vector by 90 degrees and to produce a pre-rotated vector;
    a first stage configured to perform a first set of iterative CORDIC calculations on the pre-rotated vector and to produce a first rotated vector and a remaining rotation value; and
    a second stage configured to perform a second set of iterative CORDIC calculations on the first rotated vector and to produce a second rotated vector, the second rotated vector corresponding to the input vector.

2. The CORDIC circuit of claim 1, wherein the CORDIC circuit receives a input vector as an in-phase vector value (I) and quadrature vector value (Q), and receives a required rotation value ($\phi$).

3. The CORDIC circuit of claim 1, wherein the pre-rotation stage rotates the input vector by ±90 degrees to produce the pre-rotated vector.

4. The CORDIC circuit of claim 1, wherein the second rotated vector is accurate within two thousandths of a degree of a required rotation angle.

5. The CORDIC circuit of claim 1, wherein the first stage and second stage each perform the same number of iterative CORDIC calculations.

6. The CORDIC circuit of claim 1, wherein the first stage and second stage each perform the eight iterative CORDIC calculations.

7. The CORDIC circuit of claim 1, further comprising an angle adjustment block connected to receive an input required rotation value and to produce the remaining rotation value corresponding to the output of the pre-rotation stage.

8. The CORDIC circuit of claim 1, wherein the CORDIC circuit functions as a pipeline of iterative processing stages, each iterative processing stage performing a plurality of CORDIC iterations.

9. For use in a wireless network, a mobile station comprising:
    a processor;
    a radio-frequency transceiver for receiving a radio-frequency signal;
    an RF downconversion circuit for downconverting the radio-frequency signal to produce an input vector; and
    a CORDIC circuit connected to receive the input vector, the CORDIC circuit having a pre-rotation stage configured to selectively rotate an input vector by 90 degrees and to produce a pre-rotated vector, a first stage configured to perform a first set of iterative CORDIC calculations on the pre-rotated vector and to produce a first rotated vector and a remaining rotation value, and a second stage configured to perform a second set of iterative CORDIC calculations on the first rotated vector and to produce a second rotated vector, the second rotated vector corresponding to the input vector.

10. The mobile station of claim 9, wherein the input vector includes an in-phase vector value (I) and quadrature vector value (Q).

11. The mobile station of claim 9, wherein the pre-rotation stage rotates the input vector by ±90 degrees to produce the pre-rotated vector.

12. The mobile station of claim 9, wherein the second rotated vector is accurate within two thousandths of a degree of a required rotation angle.

13. The mobile station of claim 9, wherein the first stage and second stage each perform the same number of iterative CORDIC calculations.

14. The mobile station of claim 9, wherein the first stage and second stage each perform the eight iterative CORDIC calculations.

15. The mobile station of claim 9, further comprising an angle adjustment block connected to receive an input required rotation value and to produce the remaining rotation value corresponding to the output of the pre-rotation stage.

16. The mobile station of claim 9, wherein the CORDIC circuit functions as a pipeline of iterative processing stages.

17. The mobile station of claim 9, wherein the second rotated vector is thereafter converted to a baseband signal.

18. The mobile station of claim 9, wherein the second rotated vector is a vector rotation of the input vector accurate to within two thousandths of a degree.

19. The mobile station of claim 9, wherein the second stage iteratively processes a first vector while the first stage iteratively processes a second vector.

20. A method for vector rotation for use in a wireless network, comprising:
    selectively rotating an input vector by 90 degrees to produce a pre-rotated vector;
    performing a first set of iterative CORDIC calculations on the pre-rotated vector in a first circuit stage to produce a first rotated vector and a remaining rotation value; and
    performing a second set of iterative CORDIC calculations on the first rotated vector in a second circuit stage to produce a second rotated vector, the second rotated vector corresponding to the input vector.

21. The method of claim 20, further comprising receiving the input vector as an in-phase vector value (I) and quadrature vector value (Q), and receiving a required rotation value ($\phi$).

* * * * *